United States Patent [19]

Welther

[11] 3,907,225

[45] Sept. 23, 1975

[54] SPACECRAFT FOR DEPLOYING OBJECTS INTO SELECTED FLIGHT PATHS

[75] Inventor: Robert S. Welther, Los Angeles, Calif.

[73] Assignee: TRW Inc., Cedondo Beach, Calif.

[22] Filed: Dec. 17, 1973

[21] Appl. No.: 425,397

[52] U.S. Cl. .................. 244/158; 102/49.4; 102/61; 102/69
[51] Int. Cl. ............................................ F42b 15/00
[58] Field of Search ............ 102/49.3, 49.4, 49.6, 5, 102/7.2, 61, 69; 244/158, 1 R

[56] References Cited
UNITED STATES PATENTS

| | | | |
|---|---|---|---|
| 3,380,687 | 4/1968 | Wrench et al. | 244/158 |
| 3,547,375 | 12/1970 | Mackey | 244/158 |
| 3,652,042 | 3/1972 | Welther | 244/158 |

FOREIGN PATENTS OR APPLICATIONS

| | | | |
|---|---|---|---|
| 1,506,147 | 10/1970 | Germany | 102/49.4 |

*Primary Examiner*—Trygve M. Blix
*Assistant Examiner*—Paul E. Sauberer
*Attorney, Agent, or Firm*—Daniel T. Anderson; Donald R. Nyhagen; Jerry A. Dinardo

[57] ABSTRACT

A spacecraft for deploying objects into selected multiple flight paths. The spacecraft has two separable, individually powered deployment vehicles each carrying a number of the objects. During launch, the two vehicles are mated, in interfitting relation, into a compact unitary spacecraft which is placed into a predetermined initial flight path. The two deployment vehicles are then separated and powered across the selected flight paths of the objects to be deployed. Upon arrival of each vehicle at a selected flight path, the vehicle is momentarily arrested and positioned in a proper deployment attitude and an object is deployed along the path.

4 Claims, 3 Drawing Figures

SPACECRAFT FOR DEPLOYING OBJECTS INTO SELECTED FLIGHT PATHS

BACKGROUND OF THE INVENTION

1. Field of the Invention

This invention relates generally to the space field and more particularly to a spacecraft for deploying objects into selected multiple space flight paths.

2. Prior Art

Spacecraft of the class to which this invention pertains are launched into space carrying a number of objects which are deployed at intervals from the spacecraft in a manner such that each object is inserted into a selected space flight path. The flight paths into which the objects are inserted may be either orbital paths, outer space paths, or ballistic trajectories. The invention will be described in the context of launching objects into ballistic trajectories.

According to a typical ballistic trajectory deployment sequence, the spacecraft is launched into an initial flight path and any of the objects which are to follow this path are then deployed from the spacecraft. Insertion of objects into other flight paths is accomplished by propelling the spacecraft along the local range insensitive axis, i.e., an axis passing through the spacecraft and the center of the earth, and across the desired flight paths and deploying the objects along these paths. Such deployment may be accomplished either passively or actively. Passive deployment of an object is accomplished by releasing the object for separation from the spacecraft and backing the spacecraft away from the object. Active deployment involves forcible ejection of the object from the spacecraft by spring action or the like.

Actual separation of the deployable objects from the spacecraft along the seleted flight paths may be only one of the requirements for proper insertion of the objects into these paths. Another deployment requirement may involve proper orientation of each object relative to its path at the time of separation from the spacecraft. Thus, objects which are deployed in the manner described herein generally have an axis, referred to as a reference axis, which must be oriented at a predetermined angle relative to the respective flight paths at the time of deployment.

My prior U.S. Pat. No. 3,652,042 discloses a spacecraft of the general class described. Another patent of interest with regard to such spacecraft is U.S. Pat. No. 3,547,375.

SUMMARY OF THE INVENTION

This invention provides a novel spacecraft for deploying objects into selected multiple flight paths. The spacecraft comprises two separable, individually powered units, referred to herein as deployment vehicles, with unique interfitting configurations which permit assembly or mating of the vehicles into a compact unitary spacecraft structure. Each deployment vehicle has propulsion, braking and attitude control thrusters, an object mounting platform, fuel tanks, control systems, and the like. A number of objects to be deployed are mounted on the platform of each vehicle by either active or passive deployment means.

The two deployment vehicles are initially assembled in mating or interfitting relation to form a unitary spacecraft which is stowed within the nose section of a launch vehicle for launch of the spacecraft into a predetermined initial flight path. After separation of the spacecraft from the launch vehicle, the two deployment vehicles are separated from one another. Each vehicle is then rotated by its attitude control thrusters into alignment with the local range insensitive axis with the propulsion thruster of one vehicle pointing upward and the propulsion thruster of the other vehicle pointing downward along the respective range insensitive axis. The range insensitive axes are axes passing through the deployment vehicles and the center of the earth.

At this stage, the propulsion thrusters of the deployment vehicles are fired to power the deployment vehicles up and down, respectively, along the range insensitive axes, across the flight paths along which their objects are to be deployed. The vehicles are momentarily arrested at each flight path and rotated to locate their objects in the proper deployment attitude relative to the path, after which one or more objects are deployed from each vehicle. The vehicles are then returned to alignment with their local range insensitive axes and powered along these axes to the next selected flight paths, where the deployment sequence is repeated to insert objects into the paths.

DESCRIPTION OF THE PREFERRED EMBODIMENT

Figure 1:
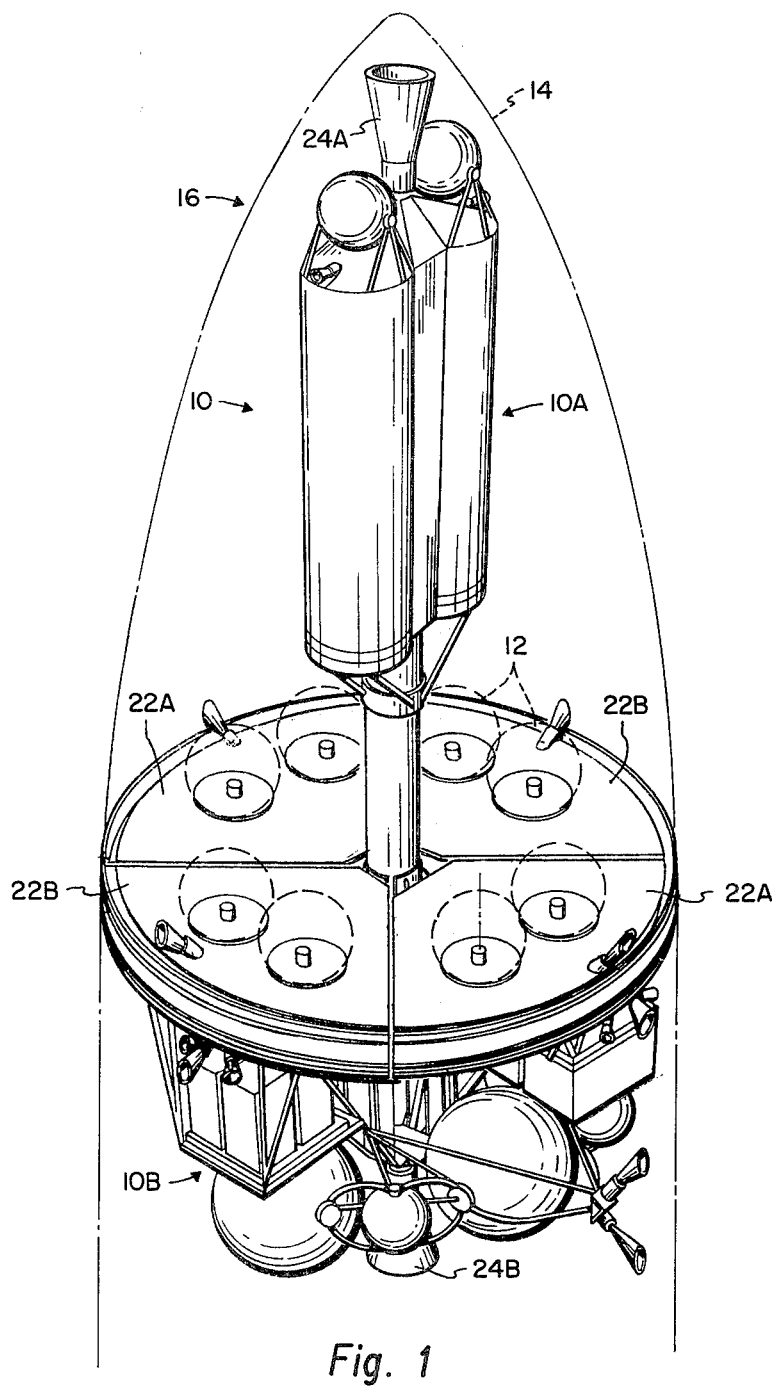
FIG. 1 is a perspective view of a dual spacecraft according to the invention showing the two deployment vehicles assembled in mating relation to form an integral launch unit.

The drawings illustrate a spacecraft 10 according to the invention for inserting or deploying objects 12 into selected multiple flight paths in predetermined attitudes relative to these paths. The spacecraft has two separable, individually powered deployment vehicles 10a, 10b each carrying a number of the objects 12. Deployment vehicles 10a, 10b are uniquely constructed and arranged to be mated into a compact unitary spacecraft structure (FIG. 1) which may be housed within the nose section 14 of a launch vehicle 16. This assembled or mated configuration of the deployment vehicles is referred to herein as their lauch configuration.

Figure 3:
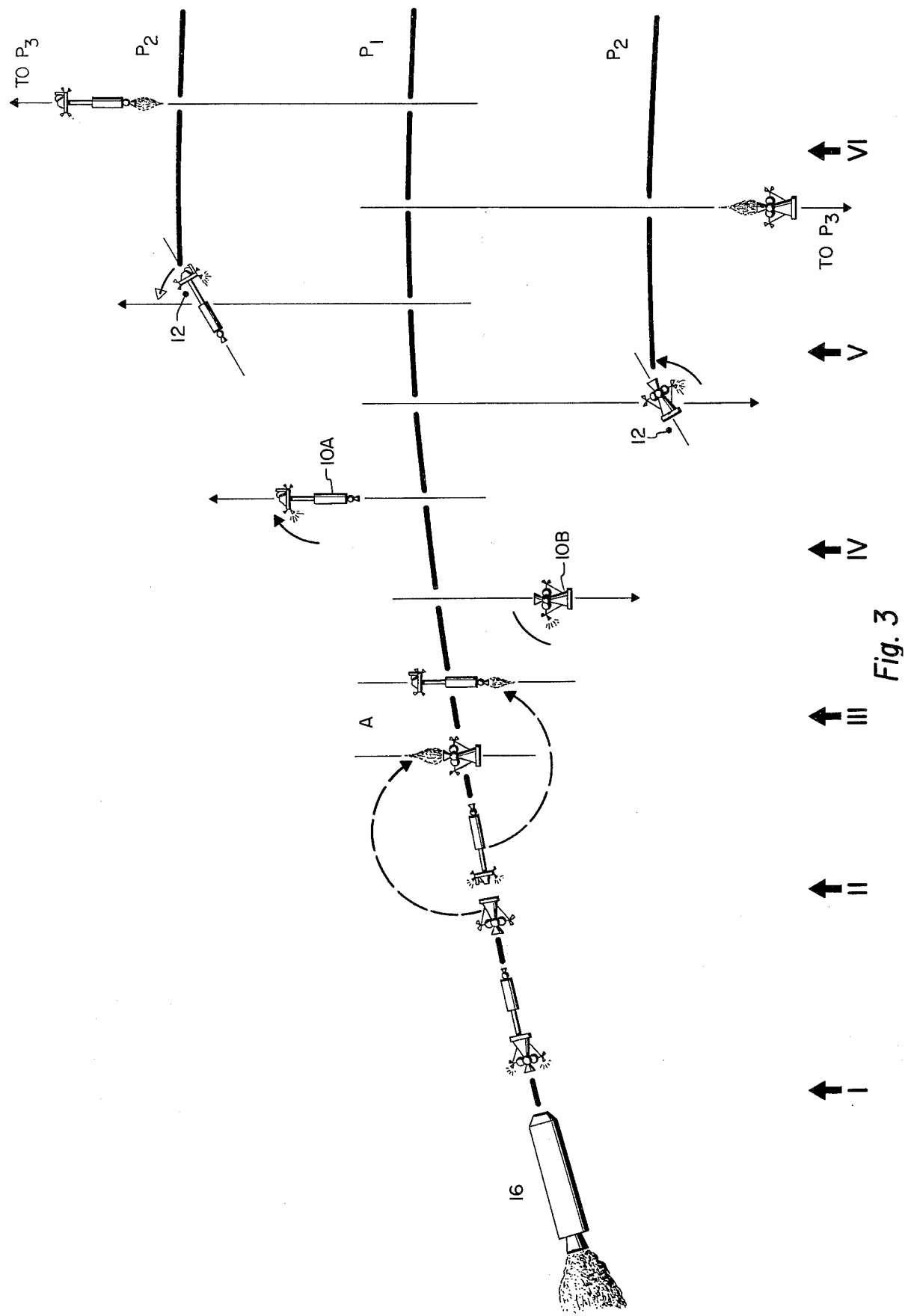
FIG. 3 illustrates the launch, separation, and object deployment sequence of the spacecraft.

In operation, the two deployment vehicles 10a, 10b are assembled in their launch configuration to form the spacecraft 10 of FIG. 1 and the latter is installed within the nose section 14 of the launch vehicle 16. The launch/object-deployment sequence of FIG. 3 is then executed. Briefly, this sequence involves launching of the launch vehicle with its contained spacecraft 10 into a selected initial flight path $P_1$, followed by separation of the spacecraft from the launch vehicle. The two deployment vehicles 10a, 10b are then separated from one another and independently aligned with the local range insensitive axes A. One deployment vehicle is powered up and the other down along its range insensitive axis, across the selected flight path $P_2$, $P_3$, etc., into which the objects are to be inserted or deployed. Each deployment vehicle is momentarily arrested at each selected flight path and rotated to position its objects 12 in a predetermined deployment attitude relative to the path. An object is then deployed from the vehicle into the flight path, after which the vehicle is realigned with its local range insensitive axis and powered along the axis to the next selected flight path where the deployment procedure is repeated.

Returning to FIGS. 1 and 2, the deployment vehicle 10a has an elongate, generally tubular body 18a mounting a main propulsion engine 20a at one end and a pair of object mounting platforms 22a at the other end. Engine 20a has a gimballed thrust chamber 24a positioned by gimbal actuators (not shown). As will be explained later, these actuators are controlled to maintain the thrust axis of the engine 20a through the center of gravity of the deployment vehicle 10a during the deployment sequence of FIG. 3. Mounted on the vehicle are fuel, oxidizer, and pressurizing tanks 26a for the engine. Alternatively, a solid propellant or hybrid propulsion system with start/stop capability may be employed on the vehicle.

Figure 2:
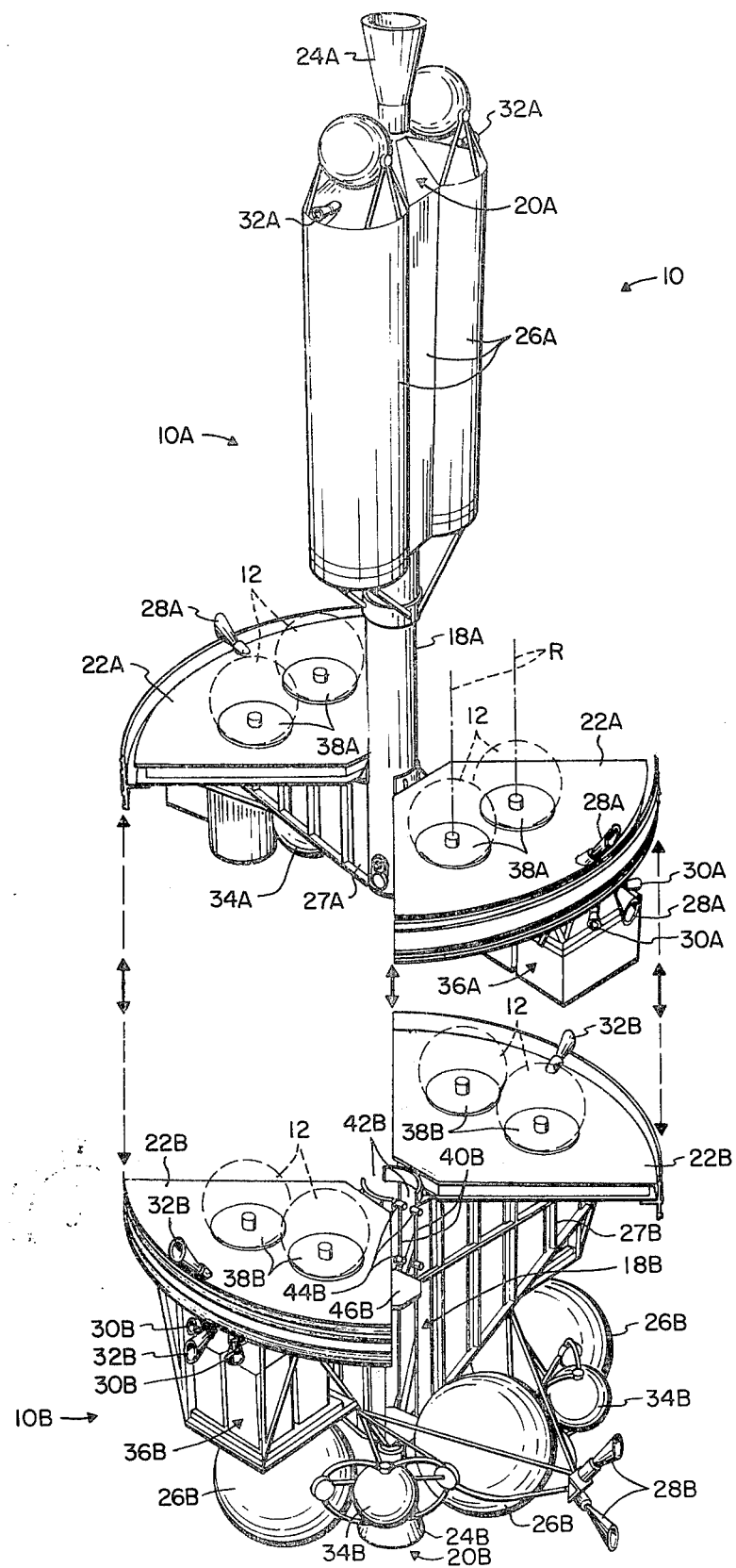
FIG. 2 is a perspective view showing the two deployment vehicles separated.

The object mounting platforms 22a conform in shape to 90° sectors and are located at diametrically opposite sides of and in a common plane normal to the axis of the vehicle body 18a. These platforms are rigidly attached to a cross-frame 27a joined to the vehicle body 18a and extending radially of the body under the platforms, as they are viewed in FIG. 2, along their common radial center line. Mounted about the arcuate edges of the platforms 22a are pitch thrusters 28a and roll thrusters 30a. Yaw thrusters 32a are mounted at the opposite end of the vehicle, adjacent the main engine thrust chamber 24a. Mounted at the underside of the platform 22a, as the deployment vehicle 10a is viewed in FIG. 2, are fuel and pressurizing tanks 34a for the thrusters and a control system 36a for the vehicle.

The objects 12 to be deployed from the deployment vehicle 10a are carried on the vehicle platforms 22a. The illustrated objects are simple spheres each having a reference axis R. Each sphere is releasably attached to its platform by a deployment actuator 38a, such as a ball lock, with the reference axis R of the sphere normal to the platform.

The deployment vehicle 10b is generally similar to the vehicle 10a and has an elongate body 18b mounting a main propulsion engine 20b at one end and a pair of object mounting platforms 22b at the other end. Engine 20b has a gimballed thrust chamber 24b positioned by gimbal actuators (not shown). These gimbal actuators, like those of deployment vehicle 10a, are controlled to maintain the thrust axis of the engine 20b through the center of gravity of the vehicle 10b during the deployment sequence of FIG. 3. Mounted on the vehicle 10b are fuel, oxidizer, and pressurizing tanks 26b for the engine. As in the deployment vehicle 10a, however, a solid propellant or hybrid propulsion system may be employed on the vehicle 10b.

The object mounting platforms 22b conform in shape to 90° sectors and are located at diametrically opposite sides of and in a common plane normal to the axes of the vehicle body 18b. Platforms 22b are rigidly attached to a cross-frame 27b joined to the vehicle body 18b and extending radially of the body under the platforms, as viewed in FIG. 2, along their common radial center line. Mounted about the arcuate edges of the platforms 22b are yaw and roll thrusters 32b, 30b. Pitch thrusters 28b are mounted at the opposite end of the vehicle body 18b. Mounted at the underside of the platforms 22b, as the deployment vehicle 10b is viewed in FIG. 2, are fuel annd pressurizing tanks 34b for the thrusters and a control system 36b for the vehicle.

As in the deployment vehicle 10a, the objects or spheres 12 to be deployed from the deployment vehicle 10b are carried on its platforms 22b. Each sphere is releasably attached to its platform by a deployment actuator 38b, such as a ball lock, with the reference axis R of the sphere normal to the platform.

The body 18b of deployment vehicle 10b has an essentially open sleeve-like form and comprises two generally semi-cylindrical sections 40b arranged at opposite sides of a plane containing the longitudinal axis of the vehicle and passing between the platforms 22b normal to their common radial center line. These semi-cylindrical body sections are spaced to define between their confronting longitudinal edges longitudinal slot-like spaces 42b which are bisected by the latter plane and open to the sector shaped spaces between the radial platform edges. Because of its similarity to a sleeve with diametrically opposed longitudinal slots, the body 18b will be so referred to herein.

The deployment vehicles 10a, 10b are constructed and arranged for assembly to their launch configuration of FIG. 1. Assembly of the vehicles to this launch configuration is accomplished by first aligning the vehicles in their coaxial relationship of FIG. 2 with their platforms 22a, 22b relatively displaced or rotated 90°, so that the platforms of each vehicle are aligned with the sector shaped spaces between the platforms of the other vehicle, as shown. The two vehicles are then moved axially toward one another in such a way that the tubular body 18a of vehicle 10a enters the sleeve body 18b of vehicle 10b in telescoping fashion to a depth wherein the platforms of each vehicle are positioned within the spaces between and in coplanar relation with the platforms of the other vehicle, as shown in FIG. 1. In this assembled relation of the vehicles, their platforms form essentially a single circular platform. The propulsion thrusters 24a, 24b of the assembled deployment vehicles or spacecraft are located at opposite ends of the craft and face in opposite axial directions of the craft. Thus, relative to the launch position of the spacecraft within the launch vehicle 16, the propulsion thruster 24b of deployment vehicle 10b faces rearwardly.

In connection with this assembly or integration of the deployment vehicles, it will be understood that the sleeve body 18b of vehicle 10b is internally sized to receive, in interfitting telescopic relation, the tubular body 18a of vehicle 10a, mounted within the sleeve body 18b, on its two sections 40b, are anti-friction rollers 44b which ride on the outer surface of the tubular body 18a of vehicle 10a to provide free relative axial telescoping movement of the vehicle bodies during assembly as well as free separation of the vehicles during the subsequent deployment sequence of FIG. 3. The slots 42b in the vehicle body 18b are sized in width to receive edgewise the cross-frame 27a of vehicle 10a. This engagement of the cross-frame in the body slots effectively keep the two vehicles against relative rotation during their initial assembly to launch configuration and subsequent separation during the deployment sequence. Relative axial assembly movement of the two deployment vehicles is limited by engagement of the lower end of the vehicle body 18a in FIG. 1 and 2 with a stop plate 46b. The vehicles may be releasably locked against axial separation by releasable latch means (not shown).

Prior to launch, the two deployment vehicles 10a, 10b are assembled in their launch configuration of FIG. 1 to form the spacecraft 10. This spacecraft is then installed within the nose section 14 of the launch vehicle 16 and the latter is launched along the initial flight path $P_1$ (FIG. 3). At the proper altitude or position along this path, and after jettisoning of the launch vehicle nose cone, the spacecraft 10 is separated from the launch vehicle by firing selected rearwardly directed thrusters of the deployment vehicle 10b, as shown at I in FIG. 3. The two deployment vehicles are then separated from one another by releasing the latch means, if any, which lock the vehicles together and firing rearwardly directed thrusters of vehicle 10a and forwardly directed thrusters of vehicle 10b, as shown at II in FIG. 3. At this point one or more objects 12 may be deployed from vehicle 10b, along the initial flight path $P_1$. This deployment may be accomplished by utilizing active deployment means 38b for projecting the objects 12 away from the platform 22b of deployment vehicle 10b or by utilizing passive deployment means and backing the vehicle away from the deployed object when released by the deployment means.

After separation of the deployment vehicles 10a, 10b, selected attitude control thrusters of the vehicles are fired to rotate the vehicles to orient their longitudinal axes along the local range insensitive axes, as depicted at IV in FIG. 3, with the propulsion thruster 24a of vehicle 10a pointed downwardly along the respective axis and the propulsion thruster 24b of vehicle 10b pointed upwardly along the respective axis, as shown at III in FIG. 3. The propulsion thrusters are then fired to propel the vehicles 10a, 10b upwardly and downwardly, respectively, along the axes to the flight paths $P_2$ along which objects 12 are to be deployed, as depicted at IV in FIG. 3. Upon arrival at these paths, the vehicles are arrested and rotated to proper positions for deploying the objects along the paths $P_2$ by firing of appropriate thrusters on the vehicles, as shown at V in FIG. 3, after which the objects are actively or passively deployed along the paths in the manner explained earlier. The vehicles are then rotated back to alignment with and propelled along their respective range insensitive axes to the next flight paths $P_3$ along which objects 12 are to be deployed, as shown at VI in FIG. 3, and the deployment procedure is repeated.

It will be understood that the above deployment sequence can be accomplished by command signals from the ground or by properly programmed automatic control systems on board the deployment vehicles 10a, 10b, such as described in the earlier mentioned U.S. Pat. No. 3,652,042. During the deployment sequence, the objects 12 are preferably deployed from the two platforms 22a, 22b of each vehicle alternately so as to maintain the center of gravity of each vehicle close to its longitudinal axis. The gimballed propulsion thrusters 24a, 24b of the vehicles are continuously positioned to align their thruster axes through the centers of gravity of the vehicles.

I claim:

1. A spacecraft for deploying objects into selected flight paths, comprising:
   a pair of deployment vehicles each having a longitudinal axis, a main propulsion thruster and pitch, roll, and yaw thrusters for propelling the vehicle along and orienting the vehicle about axes transverse to said longitudinal axis, a pair of diametrically opposed sector-shaped platforms in a plane normal to said longitudinal axis, deployment means on said platforms for mounting and deploying a number of said objects, and control means for actuating said thrusters and deployment means; and
   means for releasably joining said vehicles in assembled relation with the longitudinal axes of the vehicles aligned and with the platforms of each vehicle positioned between and in the plane of the platforms of the other vehicle such that the several platforms form a substantially circular platform shape, whereby the assembled vehicles form a compact unitary spacecraft which may be installed within a launch vehicle and launched into a selected initial flight path and thereafter said deployment vehicles may be separated and propelled upwardly and downwardly along local range insensitive axes for deployment of objects from the vehicles along additional flight paths intersecting said axes.

2. A spacecraft according to claim 1 wherein:
   each deployment vehicle has a body extending in one direction along its longitudinal axis from its platforms and a propulsion thruster at the end of said body having its thrust axis aligned with said longitudinal axis; and
   said vehicle bodies extend in opposite directions from the common plane of said platforms when said vehicles are assembled.

3. A spacecraft according to claim 2 wherein:
   said joining means comprises coacting coupling means on said vehicle bodies along their longitudinal axis which enter into telescoping relation when said vehicles are assembled.

4. The method of deploying objects into selected flight paths comprising the steps of:
   launching into a selected initial flight path a spacecraft comprising a pair of releasably joined and independently powered and controllable deployment vehicles having oppositely facing propulsion thrusters with aligned thrust axes and pitch, roll, and yaw thrusters, each vehicle mounting a number of said objects;
   separating said deployment vehicles in the direction of said thrust axes during travel of said spacecraft along said initial path;
   rotating said vehicles to align the thrust axes of their propulsion thrusters with local range insensitive axes with the propulsion thrusters facing in opposite directions along the latter axes;
   propelling said deployment vehicles upwardly and downwardly along said local range insensitive axes and across additional and successive flight paths; and
   deploying said objects from said vehicles along said latter paths.

* * * * *